(12) United States Patent
Peeters

(10) Patent No.: US 6,726,368 B2
(45) Date of Patent: Apr. 27, 2004

(54) ANTI-WRAP GUARD

(75) Inventor: Kenneth J. Peeters, Bear Creek, WI (US)

(73) Assignee: H & S Manufacturing Co., Inc., Marshfield, WI (US)

( * ) Notice: Subject to any disclaimer, the term of this patent is extended or adjusted under 35 U.S.C. 154(b) by 0 days.

(21) Appl. No.: 10/053,833

(22) Filed: Jan. 22, 2002

(65) Prior Publication Data

US 2003/0138177 A1 Jul. 24, 2003

(51) Int. Cl.$^7$ ............................................... F16C 33/78
(52) U.S. Cl. ........................................ 384/477; 56/336
(58) Field of Search ................................ 384/477, 478, 384/144, 137, 130; 56/336

(56) References Cited

U.S. PATENT DOCUMENTS

| | | | |
|---|---|---|---|
| 4,848,409 A | 7/1989 | Jahnke, Jr. ................... | 138/110 |
| 4,911,564 A | 3/1990 | Baker .......................... | 384/145 |
| 5,001,894 A | 3/1991 | Slater .......................... | 56/372 |
| 5,245,817 A | 9/1993 | Hohnl .......................... | 56/13.3 |
| 5,364,310 A | 11/1994 | Taylor ......................... | 464/170 |
| 5,370,582 A | 12/1994 | Campbell ..................... | 464/170 |
| 6,151,877 A | 11/2000 | Rowse et al. ................. | 56/372 |
| 6,205,757 B1 * | 3/2001 | Dow et al. .................... | 56/366 |
| 6,241,618 B1 | 6/2001 | Doll ............................ | 464/176 |

* cited by examiner

*Primary Examiner*—Lenard A Footland
(74) *Attorney, Agent, or Firm*—Patterson, Thuente, Skaar & Christensen, P.A.

(57) ABSTRACT

An anti-wrap guard system for shielding an exposed bearing assembly of an agricultural apparatus from any material borne by a rotatable shaft that in the course of operating the apparatus may naturally come in contact with the exposed bearing including a guard being disposable between a working section of the rotatable shaft and the bearing assembly supporting the shaft, the guard substantially blocking the material from the bearing. A windrow merger and a method of guarding are further included.

18 Claims, 3 Drawing Sheets

ANTI-WRAP GUARD

TECHNICAL FIELD

This invention relates to bearing guards. More particularly, this invention relates to the guarding of the bearings of an exposed rotating conveyor shaft which may be found on a multitude of agricultural machines, which may be subject to entanglement by vegetation and/or waste.

BACKGROUND OF THE INVENTION

Conveyor assemblies are used in many agricultural applications. For instance, conveyors are used in harvesting with combines, drying product through the use of a windrow apparatus or applying fertilizer with manure spreaders. Mechanical breakdowns can cause severe economic damage to the farmer if the equipment failure delays planting or the harvest, for instance.

A common problem found with conveyor failures in agricultural settings involves the entanglement of vegetation, or waste around the conveyor roller shafts. Weeds, stalks and the like from the crop being harvested or strings or other waste present with the material become wrapped around the shaft at the exposed portion adjacent to the shaft bearing housing. Rotation of the shaft is slowed due to build-up of the additional material and in some instances the entangled material works into the bearing housing and pushes out the lubricant or in some cases displaces the bearings. The result is premature wear and/or failure of the bearings and down time for the equipment while repairs are conducted.

In order to significantly increase the operational life of the conveyor shaft bearings on agricultural apparatus, a structure is needed to prevent the build-up of foreign material on the conveyor shaft. The structure must provide a shield which will prevent weeds, stalks, strings and the like from becoming wrapped around the shaft at the space intermediate the conveyor cylinder and the opposing face of the bearing housing. The structure must also be designed to accommodate passage of the conveyor shaft, such opening is spaced apart from, but is generally dimensioned to the outer surface of the shaft. Further the structure placement must not interfere with the performance of the conveyor.

SUMMARY OF THE INVENTION

The anti-wrap guard of the present invention substantially meets the aforementioned needs of the agricultural industry. The guard is designed to fit between the end of the conveyor roller and the opposing face of the bearing housing. This positioning protects the conveyor bearings from weeds, stalks, debris and the like which would otherwise become lodged or wrapped around the exposed portion of the conveyor shaft. The anti-wrap guard mount is attached to the frame of the agricultural apparatus through slots which allow for one degree of motional freedom so that the guard placement may be adjusted so as to be as close as possible to the conveyor roller. Further, the guard diameter need not be closely dimensioned to that of the conveyor shaft in order that foreign material does not work under the guard to impede the rotation of the shaft. The guard allows the conveyor shaft to rotate without restrictions thus protecting the normal life span of the bearings.

The present invention is particularly adaptable to attachment to many different agricultural apparatus. An embodiment of the guard mount fits under the bearing housing on each end of the conveyor and thus can be mounted to the frame of the apparatus coincident with the bearing housing. No modification to the agricultural apparatus is needed for mounting the guard.

The present invention is an anti-wrap guard system for shielding an exposed bearing assembly of an agricultural apparatus from any material borne by a rotatable shaft that in the course of operating the apparatus may naturally come in contact with the exposed bearing, including a guard being disposable between a working section of the rotatable shaft and the bearing assembly supporting the shaft, the guard substantially blocking the material from the bearing. The present invention is further a windrow merger and a method of guarding.

DETAILED DESCRIPTION OF THE DRAWINGS

The anti-wrap guard of the present invention is shown generally at 10 in the figures. The anti-wrap guard 10 has three major components: mounting base 12, anti-wrap tubing 14, and the anti-wrap tube mount 16.

Figure 1:
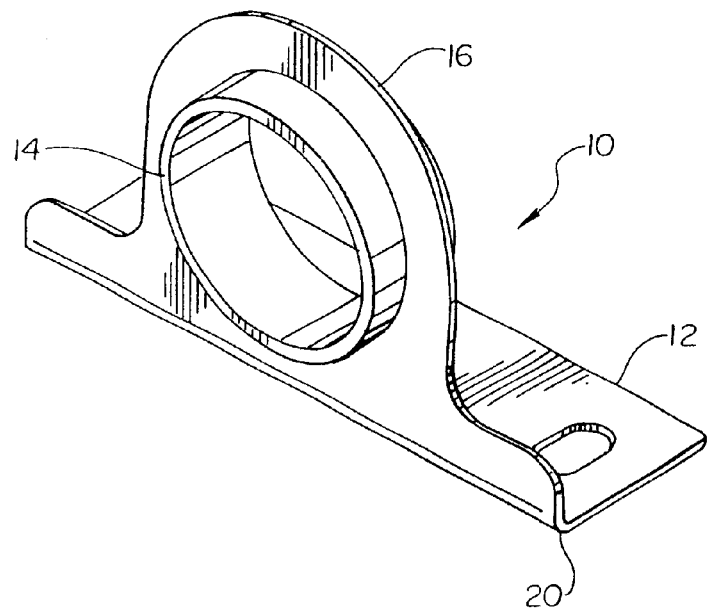
FIG. 1 is a front perspective view of the anti-wrap guard of the present invention.
Figure 2:
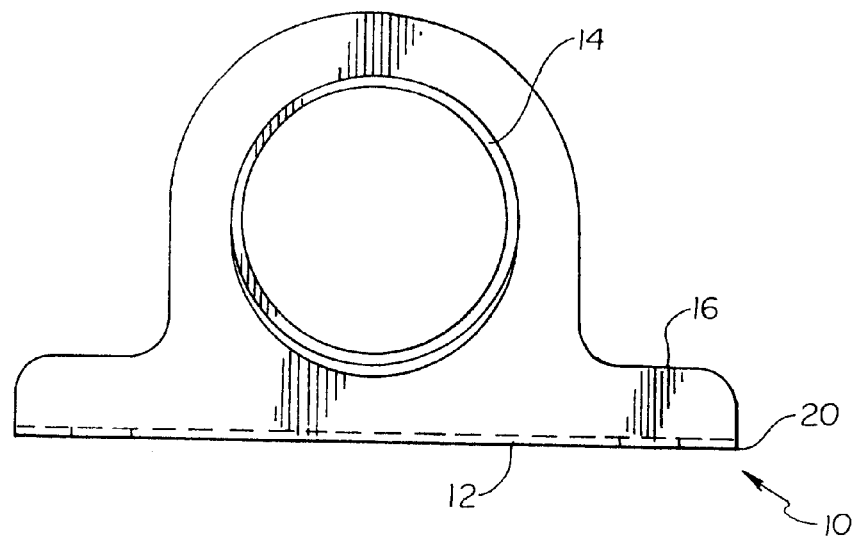
FIG. 2 is a front view of the anti-wrap guard.
Figure 3:
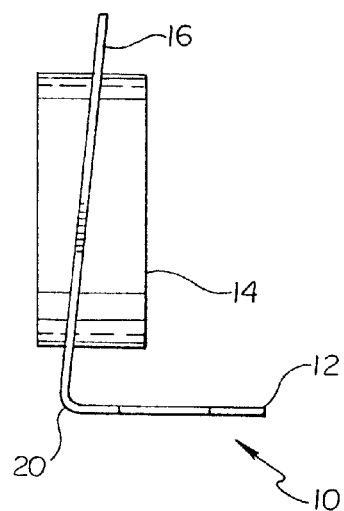
FIG. 3 is a side view of the anti-wrap guard.
Figure 4:
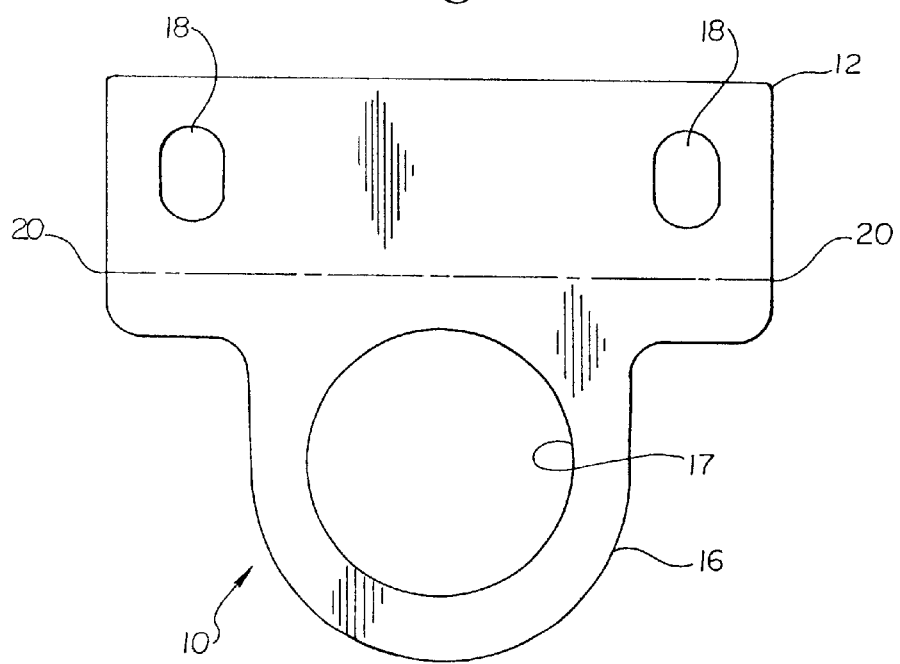
FIG. 4 is a planar diagram of the anti-wrap mount and base.

The mounting base 12 is the first major component of the anti-wrap guard 10. Referring to FIGS. 1–4, the mounting base 12 is rectangular in shape with two slots 18. The slots 18 provide for movement relative to mounting bolts to increase the flexibility in mounting the guard 10 to the applicable apparatus. The dimensions of the mounting base 12 are equal or slightly greater than that of the bearing housing 34 (See FIG. 5) to insure stability as the base 12 sits under the bearing housing 34. The mounting base 12 can be formed from a single piece of sheet metal as in FIG. 4 and bent along axis 20 to near perpendicular or beyond perpendicular as shown in FIG. 3 or two separate pieces comprising base 12 and mount 16 could be welded along axis 20 at the appropriate angle.

The anti-wrap tube mount 16 is the next major component of the anti-wrap guard 10. Referring to FIGS. 1–4, the anti-wrap tube mount 16 lies nearly perpendicular to mounting base 12. It is an important aspect of the invention that the anti-wrap tube mount 16 is set at an acute angle to mounting base 12 so as to allow connection of the anti-wrap tube 14 to the anti-wrap mount 16 on multiple axis. Further, the acute angle is substantially the same as the acute angle of the side margin plane of the bearing housing 34 in order to better protect the bearing residing in the bearing housing 34.

The anti-wrap tube mount 16 contains an opening 17 through which the anti-wrap tube 14 is inserted and fastened by welding. The length of the anti-wrap tube mount 16 along axis 20 is generally controlled by the spacing of the existing bearing supports as shown in this application as slots 18 in FIG. 4. The shape of the upper portion of the anti-wrap tube mount 16 generally forms a half-circle having the same origin as the anti-wrap tube 14, and then straightens to run perpendicular to axis 20 and finally flares out to extend the corners of mounting base 12. The shape of mount 16 is chosen to substantially shield and overlay the bearing assembly 34 to be guarded. Accordingly, the mount 16 is substantially coextensive with the side margin of the bearing assembly 34.

The anti-wrap tube 14 is the next major component of the anti-wrap guard 10. Referring to FIGS. 1–3, the anti-wrap tube 14 extends through the anti-wrap tube mount 16 parallel to mounting base 12. The anti-wrap tube 14 extends some distance on each side of the anti-wrap tube mount 16, the extent of which is determined by the area of the conveyor shaft 32 that requires shielding. The anti-wrap tube 14 must lay parallel to the conveyor shaft 32 it protects. Contact between the anti-wrap tube 14 and the conveyor shaft 32 would create friction, which would result in premature failure of the conveyor and/or guard 10.

The inside diameter of the anti-wrap tube 14 is generally determined by the outside diameter of the conveyor shaft 32 (FIG. 5) it protects, being somewhat larger than the conveyor shaft 32. The anti-wrap tube 14 is welded along its outer circumference to the anti-wrap tube mount 16.

Figure 5:
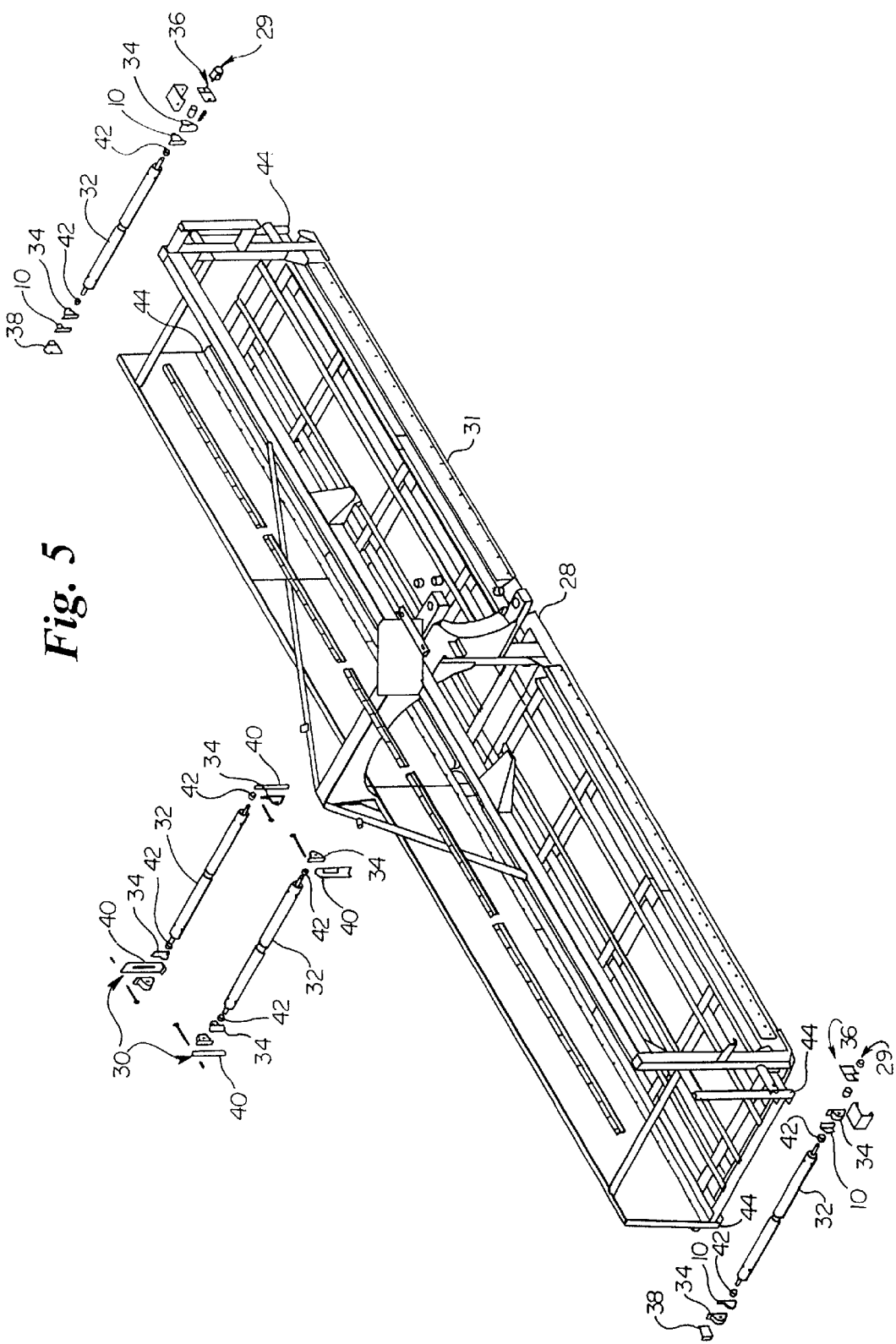
FIG. 5 is an exploded perspective view of the conveyor assembly of a windrow merger in which the anti-wrap guard has been installed.

Referring now to FIG. 5, the conveyor assembly 28 of a windrow twin merger commercially available and marketed by the assignee of the present application, H & S Manufacturing Company, Inc., of Marshfield, Wis. is depicted. This conveyor assembly 28 includes a frame 31, an inboard conveyor system 30 and an outboard conveyor system 29. Product and waste are deposited on a conveyor belt (not shown) and transported by said conveyor belt over the outboard conveyor system 29 to fall in windrows for drying.

The outboard conveyor system 29 is mounted to the exterior side of the outermost vertical supports 44 of the conveyor Frame 31. The conveyor roller 32 is rotated through the use of the conveyor motor assembly 36. The conveyor roller 32 is connected to the motor assembly 36 through a spacer 42, the anti-wrap bearing guard 10 and bearing 34. The mounting bracket 12 (FIGS. 1–4) of the anti-wrap guard 10 fits under the bearing unit 34. The bearing unit 34 fasteners also hold the anti-wrap guard 10 in place to vertical mounting support 44.

While the invention has been illustrated and described in relationship to the bearing of a conveyor for a windrow merger, its principles may find application in other environments. For example, an anti-wrap guard 10 according to the present invention could be installed on the conveyor pick-up unit of a combine or the conveyor unit of a manure spreader. Therefore, various alternatives and modifications are contemplated as being within the scope of the following claims.

What is claimed is:

1. An anti-wrap guard system for shielding a bearing assembly, the bearing assembly supporting a rotatable shaft operably connected to a conveyor roller and presenting a shaft axis, the anti-wrap guard system comprising:
    a shaft guard axially disposed along said rotatable shaft and extending generally axially over, but separate from the conveyor roller and the bearing assembly;
    a bearing assembly guard extending generally radially from the shaft guard;
    a guard mount disposed adjacent to a bearing assembly mount for adjustably shifting the position of the shaft guard along the rotatable shaft whereby the anti-wrap guard can be operatively placed adjacent to the conveyor roller, wherein the guard mount includes a plurality of attachment slots to shift the anti-wrap guard axially along the rotatable shaft.

2. An anti-wrap guard system for shielding a bearing assembly, the bearing assembly supporting a rotatable shaft operably connected to a conveyor roller and presenting a shaft axis, the anti-wrap guard system comprising:
    a shaft guard axially disposed along said rotatably shaft and extending generally axially over, but separate from the conveyor roller and the bearing assembly;
    a bearing assembly guard extending generally radially from the shaft guard, wherein an anti-wrap tube mount contains a cutout for fixing the shaft guard and forming the bearing assembly guard;
    a guard mount, wherein the anti-warp tube mount is disposed at an angle relative to the guard mount, the angle being related to a side margin angle of the bearing assembly.

3. The anti-wrap guard of claim 2 wherein the anti-wrap tube mount forms an acute angle with the guard mount.

4. An anti-wrap guard system for shielding a bearing assembly, the bearing assembly supporting a rotatable shaft operably connected to a conveyor roller and presenting a shaft axis, the anti-warp guard system comprising:
    a shaft guard axially disposed along said rotatable shaft and extending generally axially over, but separate from the conveyor roller and the bearing assembly; and
    a bearing assembly guard extending generally radially from the shaft guard, wherein an anti-warp tube mount contains a cutout for fixing the shaft guard and forming the bearing assembly guard, wherein the shaft guard is welded to the anti-wrap tube mount.

5. An anti-wrap guard system for shielding a bearing assembly, the bearing assembly supporting a rotatable shift operably connected to a conveyor roller and presenting a shaft axis, the anti-wrap guard system comprising:
    a shaft guard axially disposed along said rotatable shaft and extending generally axially over, but separate from the conveyor roller and the bearing assembly; and
    a bearing assembly guard extending generally radially from the shaft guard, wherein an anti-wrap tube mount contains a cutout for fixing the shaft guard and forming the bearing assembly guard, wherein an inside diameter of the shaft guard is determined by an outer dimensions of the rotatable shaft, in the shaft guard being sized larger than said rotatable shaft.

6. A windrow merger comprising:
    at least one conveyor assembly with at least one rotatable shaft borne by at least one bearing assembly; and
    an anti-wrap guard shielding the rotatable shaft and bearing assembly, wherein the anti-wrap guard is axially disposed about the shaft and extends generally over but separate from a conveyor roller and the bearing assembly such that the anti-wrap guard deflects material from the rotatable shaft.

7. The windrow merger of claim 6 wherein a mounting plate of the anti-wrap guard is disposed under the bearing assembly.

8. The windrow merger of claim 7 wherein the mounting plate of the anti-wrap guard includes a plurality of attachment slots to shift the anti-wrap guard axially along the rotatable shaft.

9. The windrow merger of claim 6 wherein the anti-wrap guard includes an anti-wrap tube mount supporting an anti-warp tube, said anti-wrap tube mount extending radially from the anti-wrap tube to shield the bearing assembly.

10. The windrow merger of claim 9, the anti-wrap tube being dimensioned to enclose an outside diameter of the rotatable shaft.

11. The windrow merger of claim 9, the anti-wrap tube mount being disposed at an angle relative to the mounting base, the angle being related to a side margin angle of the bearing assembly.

12. The windrow merger of claim 11 wherein the anti-wrap tube mount forms an acute angle with the mounting base.

13. The windrow merger of claim 9 wherein the anti-wrap tube is welded to the anti-wrap tube mount.

14. The windrow merger of claim 9, the anti-wrap tube being disposable on the rotatable shaft, the shaft being substantially freely rotatable with respect to the anti-wrap tube.

15. A method for guarding a bearing assembly of a rotatable shaft from agricultural material borne by said rotatable shaft, the method comprising:

disposing an anti-wrap guard generally between but separate from a conveyor roller and the bearing assembly;

shielding the bearing assembly by adjacently disposing an anti-wrap tube mount, wherein the anti-wrap tube mount is fixed at an angle related to a bearing assembly side margin angle.

16. The method of claim 15 and further comprising:

disposing a guard tubular element of the anti-wrap guard substantially co-axial with the shaft.

17. The method of claim 15 and further comprising:

shifting the anti-wrap guard along the rotatable shaft whereby the anti-wrap guard can be operatively fixed in position adjacent to said conveyor roller.

18. The method of claim 17, wherein the anti-warp guard contains a plurality of mounting slots for adjustably shifting the position along the axis of the rotatable shaft.

* * * * *